(12) United States Patent
Oshita et al.

(10) Patent No.: US 12,240,444 B2
(45) Date of Patent: Mar. 4, 2025

(54) DRIVE ASSISTANCE DEVICE AND DRIVE ASSISTANCE METHOD

(71) Applicant: Isuzu Motors Limited, Tokyo (JP)

(72) Inventors: Wasantha Oshita, Fujisawa (JP); Masaichi Takahashi, Fujisawa (JP); Shinichiro Fukazawa, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 270 days.

(21) Appl. No.: 17/801,253

(22) PCT Filed: Feb. 26, 2021

(86) PCT No.: PCT/JP2021/007292
§ 371 (c)(1),
(2) Date: Aug. 21, 2022

(87) PCT Pub. No.: WO2021/172500
PCT Pub. Date: Sep. 2, 2021

(65) Prior Publication Data
US 2023/0008352 A1 Jan. 12, 2023

(30) Foreign Application Priority Data
Feb. 28, 2020 (JP) .................................. 2020-033761

(51) Int. Cl.
 *B60W 30/09* (2012.01)
 *B60W 50/02* (2012.01)
(52) U.S. Cl.
 CPC ............ *B60W 30/09* (2013.01); *B60W 50/02* (2013.01); *B60W 2050/021* (2013.01)

(58) Field of Classification Search
CPC . B60W 30/09; B60W 50/02; B60W 2050/021
See application file for complete search history.

(56) References Cited

U.S. PATENT DOCUMENTS

| | | | |
|---|---|---|---|
| 8,170,770 B2* | 5/2012 | Grolle .................. | B60W 30/16 |
| | | | 701/96 |
| 2013/0030687 A1* | 1/2013 | Shida ................... | G01S 5/0072 |
| | | | 701/301 |
| 2016/0272172 A1* | 9/2016 | Lee ......................... | B60T 7/22 |
| 2018/0037112 A1* | 2/2018 | Otake ................ | B60W 10/182 |
| 2018/0065627 A1* | 3/2018 | Ohmura ............... | B60W 30/09 |
| 2018/0281791 A1* | 10/2018 | Fukaya .............. | B60W 30/095 |
| 2019/0168754 A1* | 6/2019 | Makled ................ | B60W 30/16 |
| 2019/0344790 A1 | 11/2019 | Kitagawa | |
| 2019/0382012 A1* | 12/2019 | Lee ...................... | G06V 20/584 |
| 2020/0023736 A1* | 1/2020 | Kaneta ............... | B60W 50/029 |
| 2020/0231142 A1* | 7/2020 | Liu ........................ | G01S 13/931 |
| 2020/0290641 A1 | 9/2020 | Kawakami | |

FOREIGN PATENT DOCUMENTS

| | | |
|---|---|---|
| JP | 07-017295 | 1/1995 |
| JP | 2018-180594 | 11/2018 |
| JP | 2019-142246 | 8/2019 |
| WO | WO 2018/225225 | 12/2018 |

\* cited by examiner

*Primary Examiner* — Ramon A. Mercado
*Assistant Examiner* — Mohamad O El Sayah

(57) ABSTRACT

This drive assistance device comprises an ACC unit, an abnormality detection unit for detecting an abnormality from a detector used to perform ACC, and a vehicle stop control unit for performing control to stop an ego vehicle when an abnormality is detected by the abnormality detection unit and an inter-vehicle distance to a preceding vehicle satisfies a certain condition.

10 Claims, 4 Drawing Sheets

DRIVE ASSISTANCE DEVICE AND DRIVE ASSISTANCE METHOD

TECHNICAL FIELD

The present disclosure relates to a driving assistance apparatus that assists the driving of a vehicle and a driving assistance method of assisting the driving of the vehicle.

BACKGROUND ART

In recent years, as one technology of assisting the driving of a vehicle, adaptive cruise control (hereinafter referred to as "ACC") has been gathering attention (for example, see Patent Literature (hereinafter, referred to as PTL 1)). The ACC is a technology of obtaining the vehicle speed of a vehicle, the relative speed of a leading vehicle with respect to the vehicle, the inter-vehicle distance between the vehicle and the leading vehicle, and the like, and controlling a driving system and a braking system of the vehicle such that the vehicle speed and the inter-vehicle distance between the vehicle and the leading vehicle are maintained to be constant.

In the ACC, in general, cruise control (hereinafter referred to as "CC") takes place for controlling the speed of own vehicle to a set vehicle speed that is set in advance when there are no leading cars. The CC is a technology of detecting a difference between the set vehicle speed set by a driver and the actual vehicle speed and controlling the engine output and the gear stage (gear ratio) of a transmission on the basis of the speed difference, to thereby control the actual vehicle speed to converge to the set vehicle speed.

CITATION LIST

Patent Literature

PTL 1
Japanese Patent Application Laid-Open No. HEI 7-17295

SUMMARY OF INVENTION

Technical Problem

In a vehicle in which an ACC function is installed, when a detector (for example, a millimeter-wave radar or a camera) necessary for executing the ACC fails during the execution of the ACC and information for executing the ACC cannot be obtained, it is common to end the ACC and enter a mode in which the driver is to drive.

Although the driver is to be notified of the fact that the ACC is to be ended by an indicator and the like, the driver who has been relying on the ACC to that point cannot always rapidly perform a driving operation. As a result, an accident may be caused. In particular, when the detector fails and the ACC ends when the vehicle is about to be stopped, a risk that an accident is caused becomes higher than other situations.

The present disclosure has been made in view of the points above and provides a driving assistance apparatus and a driving assistance method capable of reducing the possibility of collision even when a detector necessary for executing ACC fails during the execution of the ACC and normal ACC cannot be executed.

Solution to Problem

One aspect of a driving assistance apparatus of the present disclosure is an apparatus that assists driving of a vehicle, the driving assistance apparatus comprising:

an ACC section that executes adaptive cruise control (ACC) on basis of at least an inter-vehicle distance from own car to a leading car and a relative speed between the own car and the leading car;

an abnormality detection section that detects an abnormality of a detector used to execute the ACC; and a vehicle-stopping control section that performs vehicle-stopping control of the own car when an abnormality is detected by the abnormality detection section and the inter-vehicle distance from the leading car satisfies a predetermined condition.

One aspect of a driving assistance method of the present disclosure is a method of assisting driving of a vehicle, the driving assistance method comprising:

an ACC step of executing adaptive cruise control (ACC) on the basis of at least an inter-vehicle distance from own car to a leading car and a relative speed between the own car and the leading car;

an abnormality detection step of detecting an abnormality of a detector used to execute the ACC; and a vehicle-stopping control step of performing vehicle-stopping control of the own car when an abnormality is detected in the abnormality detection step and the inter-vehicle distance from the leading car satisfies a predetermined condition.

Advantageous Effects of Invention

According to the present disclosure, the vehicle-stopping control section performs the vehicle-stopping control of the own car when an abnormality is detected by the abnormality detection section and the inter-vehicle distance from the leading car satisfies a predetermined condition. Therefore, the possibility of collision can be reduced even when a detector necessary for executing the ACC fails during the execution of the ACC and normal ACC cannot be executed.

DESCRIPTION OF EMBODIMENTS

One embodiment of the present invention is described in detail below with reference to the accompanying drawings.

<1> Configuration of Vehicle

First, the configuration of a vehicle including a driving assistance apparatus according to one embodiment of the present disclosure is described.

Figure 1:
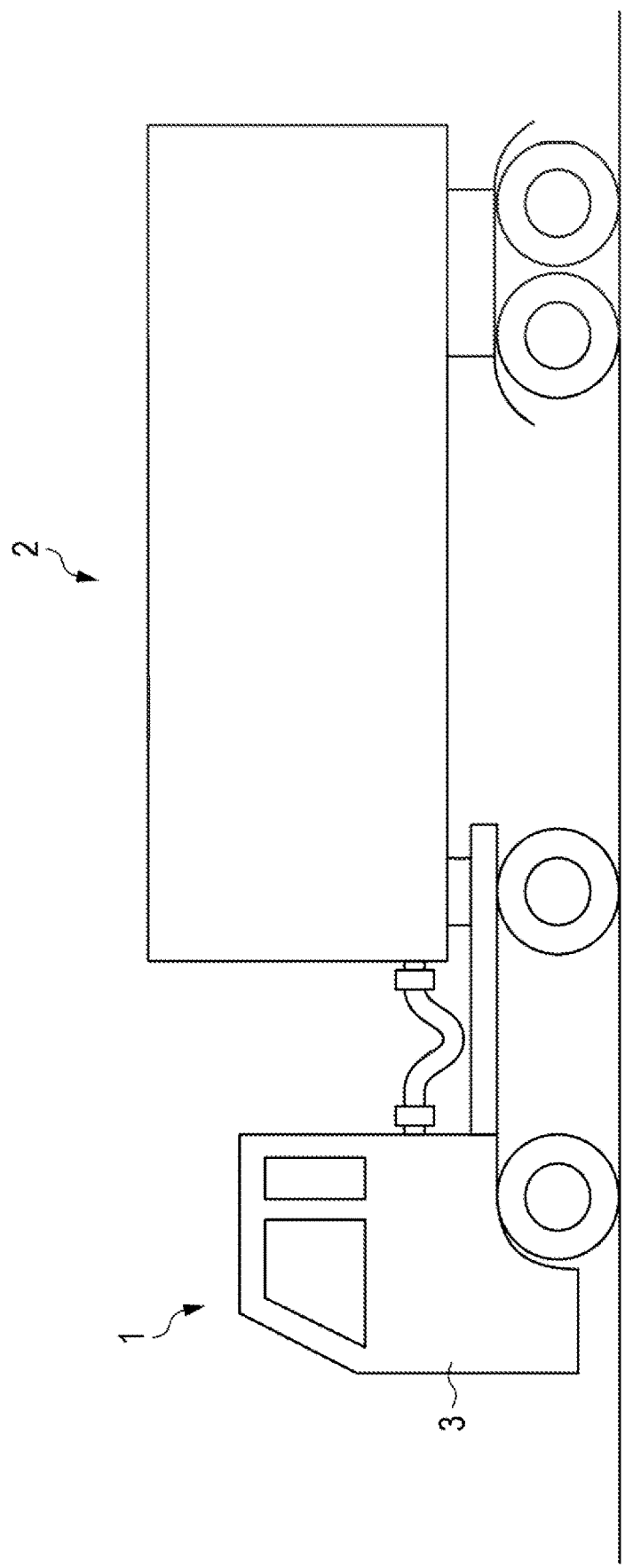
FIG. 1 is an external view illustrating an example of a vehicle to which a driving assistance apparatus according to an embodiment is applied.
Figure 2:
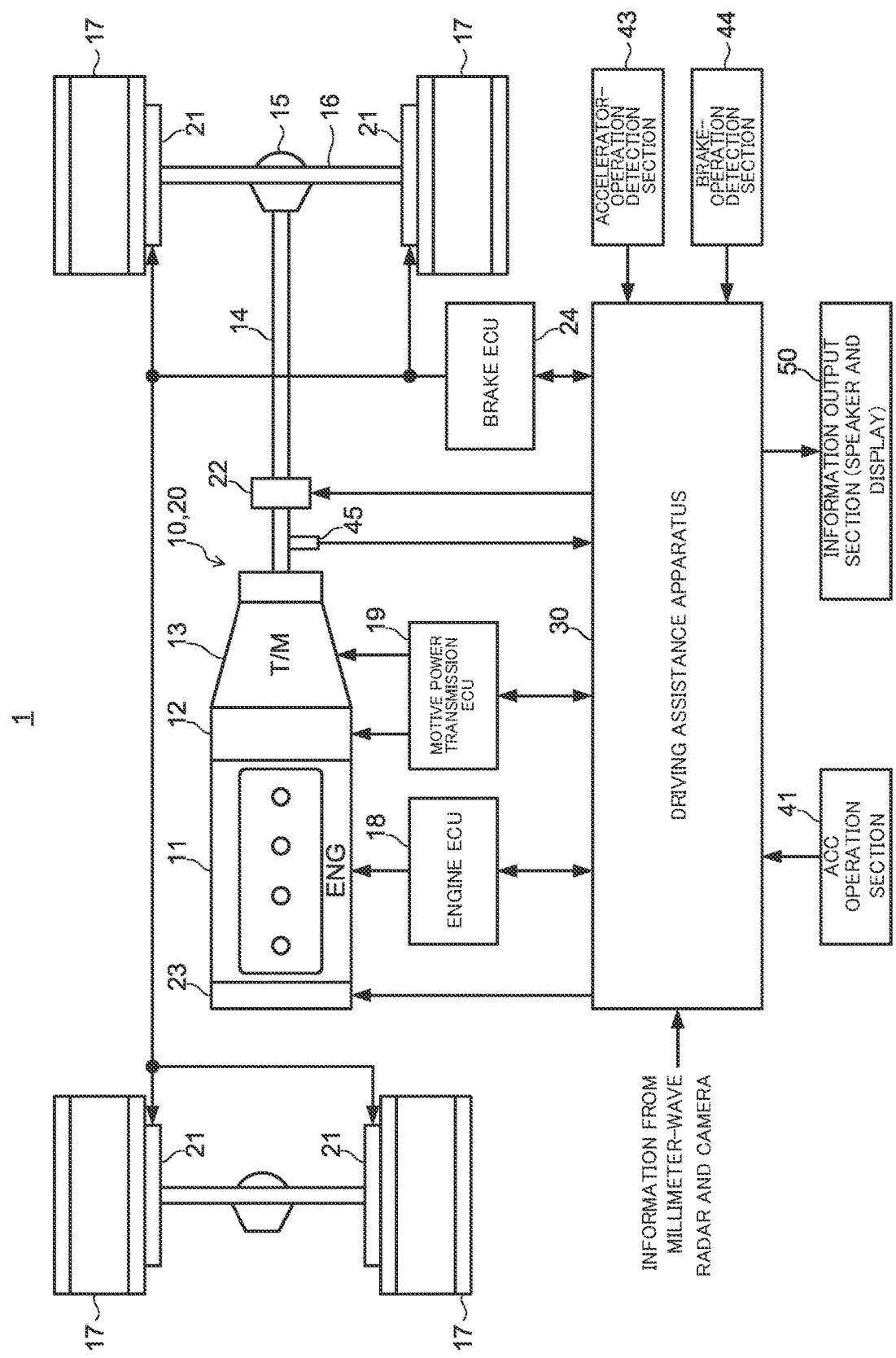
FIG. 2 is a block diagram illustrating the configuration of the vehicle of the embodiment.

FIG. 1 is an external view illustrating an example of vehicle 1 to which a driving assistance apparatus according to the present embodiment is applied. FIG. 2 is a block diagram illustrating the configuration of vehicle 1. Illustration and description are made by focusing on parts relating to the driving assistance apparatus.

As illustrated in FIG. 1, vehicle 1 is a tractor (traction vehicle) capable of towing trailer 2 as a result of coupling trailer 2 to the tractor. Vehicle 1 has vehicle main-body portion 3 including a power system such as an engine and driving wheels and a driver's seat, and trailer 2 coupled to vehicle main-body portion 3.

As illustrated in FIG. 2, vehicle 1 has driving system 10 that causes vehicle 1 to travel, braking system 20 that decelerates vehicle 1, driving assistance apparatus 30 that assists the driving of vehicle 1 by a driver, and the like.

Driving system 10 has engine 11, clutch 12, transmission 13, propeller shaft 14, differential gear 15, drive shaft 16, wheels 17, engine ECU 18, and motive power transmission ECU 19.

Engine ECU 18 and motive power transmission ECU 19 are connected to driving assistance apparatus 30 by an in-vehicle network such as a controller area network (CAN) and are able to transmit and receive necessary data and control signals to and from each other. Engine ECU 18 controls the output of engine 11 in accordance with a drive command from driving assistance apparatus 30. Motive power transmission ECU 19 controls the connection and disconnection of clutch 12 and the speed change of transmission 13 in accordance with a drive command from driving assistance apparatus 30.

The motive power of engine 11 is transmitted to transmission 13 via clutch 12. The motive power transmitted to transmission 13 is further transmitted to wheels 17 via propeller shaft 14, differential gear 15, and drive shaft 16. As a result, the motive power of engine 11 is transmitted to wheels 17, and vehicle 1 travels.

Braking system 20 has service brakes 21, auxiliary brakes 22, 23, a parking brake (not shown), and brake ECU 24.

Service brake 21 is a brake that is generally referred to as a main brake, a friction brake, a foot brake, a foundation brake, or the like. Service brake 21 is a drum brake that obtains braking force by pressing a brake lining against the inner side of a drum that rotates with wheel 17, for example.

Auxiliary brake 22 is a retarder (hereinafter referred to as "retarder 22") that obtains braking force by directly giving load to the rotation of propeller shaft 14, and is an electromagnetic retarder, for example. Auxiliary brake 23 is an exhaust brake (hereinafter referred to as "exhaust brake 23") that increases an effect of an engine brake with use of rotational resistance of the engine. By providing retarder 22 and exhaust brake 23, the braking force can be increased, and the frequency of usage of service brakes 21 is reduced. Therefore, the wear-out of brake lining and the like can be suppressed.

Brake ECU 24 is connected to driving assistance apparatus 30 by an in-vehicle network such as a CAN and is able to transmit and receive necessary data and control signals to and from each other. Brake ECU 24 controls the braking force of service brakes 21 (the brake fluid pressure of wheel cylinders of wheels 17) in accordance with a braking command from driving assistance apparatus 30.

The braking operation of service brakes 21 is controlled by driving assistance apparatus 30 and brake ECU 24. The braking operation of retarder 22 and exhaust brake 23 is controlled by on/off by driving assistance apparatus 30. The braking force of retarder 22 and exhaust brake 23 is substantially fixed. Therefore, when a desired braking force is to be accurately generated, service brakes 21 that can fine-adjust the braking force are suitable.

Information from a millimeter-wave radar and a camera is input to driving assistance apparatus 30. Information from the millimeter-wave radar and the camera is information indicating the traffic situation and the road situation ahead of the vehicle. Driving assistance apparatus 30 has ACC operation section 41, accelerator-operation detection section 43, brake-operation detection section 44, and the like.

Driving assistance apparatus 30 forms control signals for controlling the operation of driving system 10 and braking system 20. In particular, driving assistance apparatus 30 of the present embodiment obtains a target acceleration/deceleration speed for realizing ACC and a target acceleration speed for realizing CC and outputs the target acceleration/deceleration speed and the target acceleration speed to engine ECU 18, motive power transmission ECU 19, and brake ECU 24, as appropriate.

Although not shown, each of engine ECU 18, motive power transmission ECU 19, brake ECU 24, and driving assistance apparatus 30 has a central processing unit (CPU), a storage medium such as a read only memory (ROM) in which a control program is stored, a working memory such as a random access memory (RAM), and a communication circuit, for example. In this case, for example, the functions of sections described below constituting driving assistance apparatus 30 are realized by executing control programs by the CPU. All or some of engine ECU 18, motive power transmission ECU 19, brake ECU 24, and driving assistance apparatus 30 may be integrated.

ACC operation section 41 includes an ACC ON/OFF switch for performing ON/OFF control of the operation of the ACC. ACC operation section 41 includes setting switches for setting various settings of the ACC. A driver can set a target inter-vehicle distance and a target own-vehicle speed, for example, by operating the setting switches. Those switches may be realized by a user interface displayed on a display with a touch screen.

Accelerator-operation detection section 43 detects the depression amount of an accelerator pedal and outputs the detection result to driving assistance apparatus 30. Driving assistance apparatus 30 transmits drive commands to engine ECU 18 and motive power transmission ECU 19 on the basis of the depression amount of the accelerator pedal.

Brake-operation detection section 44 detects the depression amount of a brake pedal for operating service brakes 21. Brake-operation detection section 44 detects whether an auxiliary brake lever that causes retarder 22 or exhaust brake 23 to operate has been operated. Brake-operation detection section 44 outputs the detection result relating to the brake pedal and the auxiliary brake lever to driving assistance apparatus 30. Driving assistance apparatus 30 transmits a braking command to brake ECU 24 on the basis of the depression amount of the brake pedal. Driving assistance apparatus 30 controls the ON/OFF operation of retarder 22 or exhaust brake 23 on the basis of the operation of the auxiliary brake lever.

Driving assistance apparatus 30 outputs various information relating to traveling from information output section 50. For example, information output section 50 outputs that sound and display, to thereby indicate that the ACC is being executed or the ACC is being stopped.

<2> Configuration of Driving Assistance Apparatus

Figure 3:
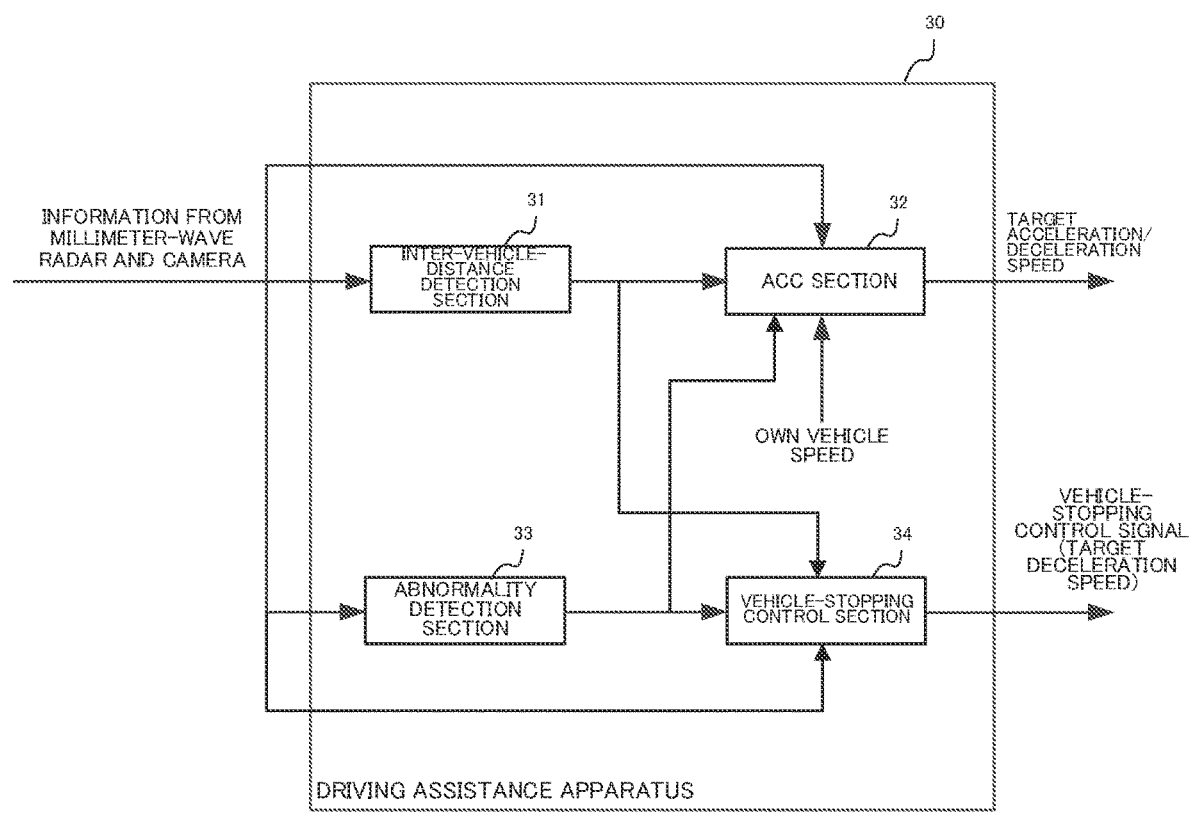
FIG. 3 is a block diagram illustrating the configuration of the driving assistance apparatus.

FIG. 3 is block diagram illustrating the configuration of driving assistance apparatus 30 of the present embodiment.

Driving assistance apparatus 30 has inter-vehicle-distance detection section 31, ACC section 32, abnormality detection section 33, and vehicle-stopping control section 34.

Inter-vehicle-distance detection section 31 measures (detects) the inter-vehicle distance between own vehicle 1 and a leading car on the basis of information obtained by the millimeter-wave radar, the camera, and the like, and outputs the measurement result to ACC section 32. Inter-vehicle-distance detection section 31 may measure the inter-vehicle distance on the basis of information from other sensors such as a laser radar.

ACC section 32 basically executes known ACC processing. In other words, ACC section 32 outputs a target acceleration/deceleration speed for causing own car to follow a leading car on the basis of the relative speed and the inter-vehicle distance between the own car and the leading car. As a result, automatic following control is realized. When there are no leading cars, ACC section 32 outputs a target acceleration speed for causing the speed of the own car to be a set certain speed. As a result, constant-speed traveling control is realized.

Automatic-following traveling control is control that operates driving system 10 and braking system 20 such that the inter-vehicle distance is within a predetermined target range and the relative speed approaches zero when a leading vehicle is present in a predetermined range. The constant-speed traveling control is control that operates driving system 10 and braking system 20 such that the traveling speed of vehicle 1 approaches a predetermined target value when there are no leading vehicles in a predetermined range.

The outputs of detectors used to realize the ACC are input to abnormality detection section 33, which detects the abnormality of each detector. For example, the detectors used to realize the ACC include the millimeter-wave radar, the camera, the laser radar (not shown), a vehicle speed sensor (not shown), and the like. An abnormality signal is output to abnormality detection section 33 when the outputs of those detectors are in a state in which the ACC cannot be normally executed (for example, when there is a failure). The abnormality signal is transmitted to ACC section 32 and vehicle-stopping control section 34.

The output of abnormality detection section 33, the output of inter-vehicle-distance detection section 31, and information from the millimeter-wave radar and the camera are input to vehicle-stopping control section 34. When an abnormality is detected by abnormality detection section 33 and the inter-vehicle distance from the leading car satisfies a predetermined condition, vehicle-stopping control section 34 outputs a vehicle-stopping control signal (target deceleration speed) for performing vehicle-stopping control of the own car. The target deceleration speed is a target deceleration speed at a fixed value independent of the detector in which an abnormality is detected. The target deceleration speed is transmitted to brake ECU 24.

<3> Traveling Control Operation of Driving Assistance Apparatus

Figure 4:
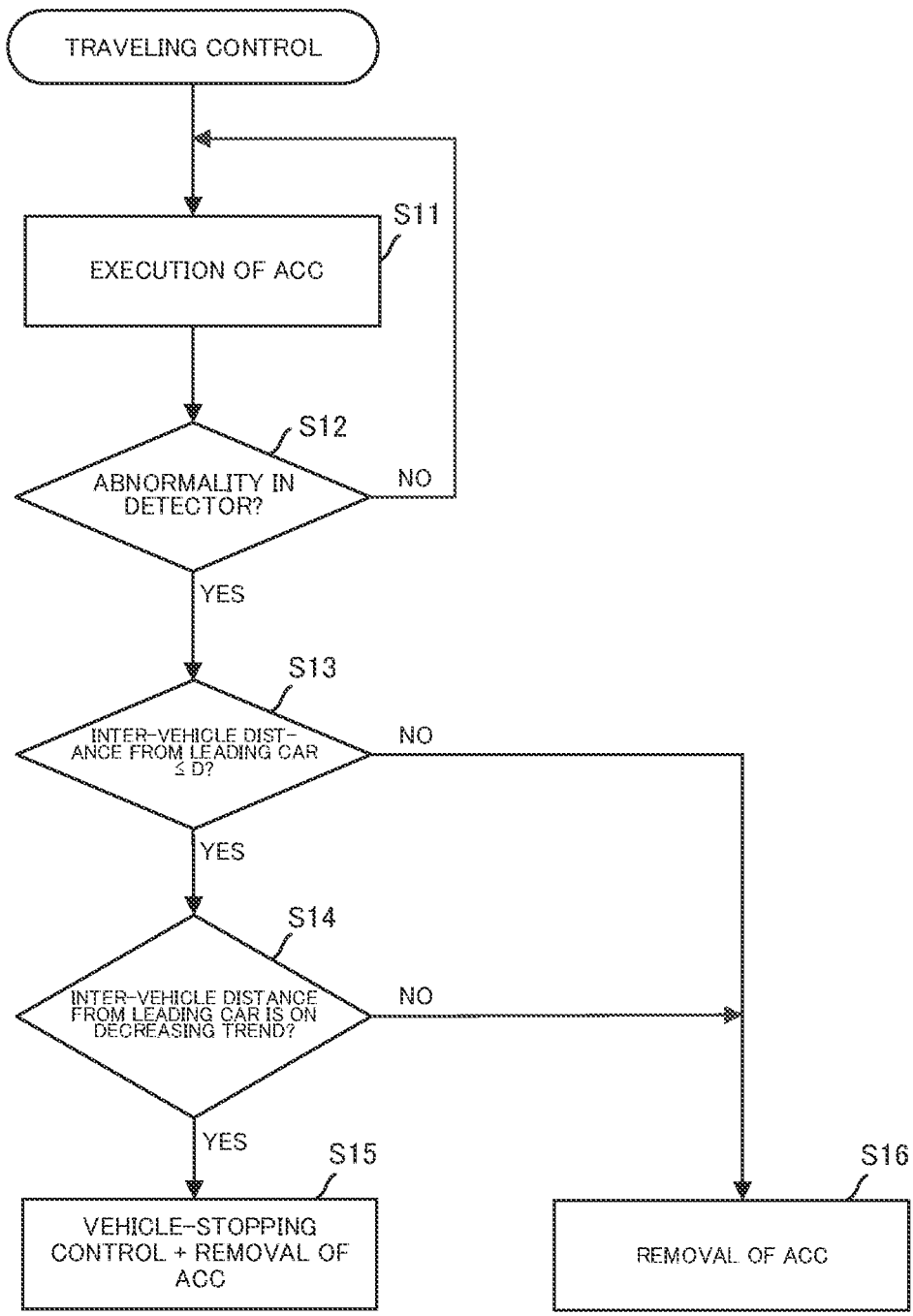
FIG. 4 is a flowchart provided for the description of a traveling control operation of the driving assistance apparatus.

Next, a traveling control operation of driving assistance apparatus 30 is described. FIG. 4 is a flowchart provided for the description of the traveling control operation of driving assistance apparatus 30.

First, driving assistance apparatus 30 executes the ACC by ACC section 32 in Step S11. In following Step S12, abnormality detection section 33 performs abnormality determination of the detector used in the ACC, and driving assistance apparatus 30 returns to Step S11 and continues the ACC when there are no abnormalities in the detector (Step S12; NO).

Meanwhile, when there is an abnormality in the detector (Step S12; YES), driving assistance apparatus 30 transitions to Step S13. When there is an abnormality in the detector, an abnormality detection signal is output to ACC section 32 and vehicle-stopping control section 34 from abnormality detection section 33. As a result, ACC section 32 and vehicle-stopping control section 34 can recognize that there is an abnormality in the detector.

In Step 13, it is determined whether the inter-vehicle distance from the leading car is equal to or less than threshold value D. In Step S14, it is determined whether the inter-vehicle distance from the leading car is on a decreasing trend. Those determinations are performed by vehicle-stopping control section 34.

When an affirmative result is obtained in both of Step S13 and Step S14, in other words, when the inter-vehicle distance from the leading car is equal to or less than threshold value D and the inter-vehicle distance from the leading car is on a decreasing trend, the processing transitions to Step S15. In Step S15, vehicle-stopping control by vehicle-stopping control section 34 is performed and the ACC is removed. The driver is to be notified of the fact that the vehicle-stopping control by vehicle-stopping control section 34 is being performed and the ACC is removed by information output section 50.

When an affirmative result is obtained in both of Step S13 and Step S14, it means that the inter-vehicle distance from the leading car is short and the distance from the leading car is to be decreased. When the ACC is removed in such a situation, there is a risk that an accident is caused. Thus, in Step S15, driving assistance apparatus 30 of the present embodiment performs vehicle-stopping control by vehicle-stopping control section 34 with the removal of the ACC. At this time, the vehicle-stopping control signal (target deceleration speed) is output to brake ECU 24 from vehicle-stopping control section 34. As a result, vehicle 1 stops in accordance with the target deceleration speed.

Meanwhile, when a negative result is obtained in either one of Step S13 and Step S14, in other words, when the inter-vehicle distance from the leading car is greater than threshold value D or the inter-vehicle distance from the leading car is not on a decreasing trend, the processing transitions to Step S16. In Step S16, the ACC is removed, and the vehicle-stopping control by vehicle-stopping control section 34 is not performed. The driver is to be notified of the fact that the ACC is removed by information output section 50.

When a negative result is obtained in either one of Step S13 and Step S14, it means that a possibility that an accident is caused is extremely low even when the ACC is removed. Thus, driving assistance apparatus 30 of the present embodiment does not perform the vehicle-stopping control by vehicle-stopping control section 34 and only performs the removal of the ACC in Step S16. In other words, the removal of the ACC is performed, and the driving operation of the driver is relied on.

Strictly speaking, when a determination result indicating that there is an abnormality in the detector is obtained in Step S12, it means that the inter-vehicle distance from the leading car cannot be detected, and hence the determination in Step S13 and Step S14 cannot be performed. In order to avoid the above, in the present embodiment, vehicle-stopping control section 34 constantly has the inter-vehicle distance from the leading car input thereto and stored therein and performs the determination in Step S13 and Step S14 with use of the inter-vehicle distance immediately before an abnormality occurs in the detector.

<4> Effects of Embodiment

As described above, according to the present embodiment, driving assistance apparatus 30 includes: ACC section 32; abnormality detection section 33 that detects an abnormality of the detector used to execute the ACC; and vehicle-stopping control section 34 that performs the vehicle-stopping control of the own car when an abnormality is detected by abnormality detection section 33 and the inter-vehicle distance from the leading car satisfies a predetermined condition. As a result, driving assistance apparatus 30 capable of reducing the possibility of collision even when the detector necessary for executing the ACC fails during the execution of the ACC and normal ACC cannot be executed.

<5> Other Embodiments

The abovementioned embodiment is merely an example of a realization for carrying out the present invention, and the interpretation of the technical scope of the present invention is not to be limited by those embodiments. In other words, the present invention can be carried out in various forms without departing from the gist or the main features of the present invention.

<5-1> In the abovementioned embodiment, vehicle-stopping control section 34 is described to be separate from ACC section 32, but vehicle-stopping control section 34 may be included in ACC section 32. In other words, in the abovementioned embodiment, the vehicle-stopping control is described to be a control different from the ACC, but the vehicle-stopping control may be performed as a part of the ACC. It can also be said that the processing of the abovementioned embodiment performs the ACC that outputs a predetermined target deceleration speed that is independent of the detector in which an abnormality is detected when an abnormality is detected by abnormality detection section 33 and the inter-vehicle distance from the leading car satisfies a predetermined condition.

<5-2> In the abovementioned embodiment, a case where the vehicle-stopping control of the own car is performed when an abnormality is detected by abnormality detection section 33, the inter-vehicle distance is equal to or less than predetermined threshold value D, and the inter-vehicle distance is on a decreasing trend, but the present invention is not limited thereto. For example, vehicle-stopping control section 34 may perform the vehicle-stopping control of the own car when an abnormality is detected by abnormality detection section 33 and the inter-vehicle distance is on a decreasing trend.

<5-3> In addition to the abovementioned embodiment, a state determination section that determines that the own car is about to be stopped may be further included, and the vehicle-stopping control by vehicle-stopping control section 34 may be executed when the state determination section determines that the own car is about to be stopped. By the above, as compared to other cases, the vehicle-stopping control is performed when the vehicle is about to be stopped, that is, when the possibility of collision is high when the ACC is removed.

The state determination section may determine whether the vehicle is about to be stopped on the basis of the inter-vehicle distance from the leading car and the own car speed. The inter-vehicle distance from the leading car used in the determination of whether the vehicle is about to be stopped is preferably a distance shorter than an inter-vehicle distance set for the ACC.

<5-4> In addition to the abovementioned embodiment, the vehicle-stopping control by vehicle-stopping control section 34 may be continued until there is an operation relating to traveling by the driver. In other words, when there is an operation relating to traveling by the driver, the vehicle-stopping control by vehicle-stopping control section 34 is removed. By the above, the vehicle-stopping control by vehicle-stopping control section 34 can be prevented from hindering the operation relating to traveling by the driver. For example, a case where brake control is performed by vehicle-stopping control section 34 even when the driver is stepping on an accelerator is prevented.

<5-5> In the present embodiment, a case where vehicle 1 to which the driving assistance apparatus and method of the present invention are applied is a tractor capable of towing trailer 2 by coupling trailer 2 to the tractor is described. However, the vehicle to which the present invention is applicable is not limited thereto and may be a vehicle such as a passenger car.

The present application is based on Japanese Patent Application (Japanese Patent Application No. 2020-33761) filed on Feb. 28, 2020, the entire content of which is incorporated herein by reference.

INDUSTRIAL APPLICABILITY

The driving assistance apparatus and the driving assistance method of the present disclosure are suitable for use as a driving assistance apparatus and a driving assistance method capable of reducing the possibility of collision even when a detector necessary for executing ACC fails during the execution of the ACC and normal ACC cannot be executed.

REFERENCE SIGNS LIST

1 Vehicle
2 Trailer
3 Vehicle main-body portion
10 Driving system
11 Engine
12 Clutch
13 Transmission
14 Propeller shaft
15 Differential gear
16 Drive shaft
17 Wheel
18 Engine ECU
19 Motive power transmission ECU
20 Braking system
21 Service brake
22 Retarder
23 Exhaust brake
24 Brake ECU
30 Driving assistance apparatus
31 Inter-vehicle-distance detection section
32 ACC section
33 Abnormality detection section
34 Vehicle-stopping control section
41 ACC operation section
43 Accelerator-operation detection section
44 Brake-operation detection section
50 Information output section

The invention claimed is:

1. A driving assistance apparatus that assists driving of a vehicle, the driving assistance apparatus comprising:
   an ACC section that executes adaptive cruise control (ACC) on basis of at least an inter-vehicle distance from own car to a leading car and a relative speed between the own car and the leading car;
   an abnormality detection section that detects an abnormality of a detector used to execute the ACC; and a vehicle-stopping control section that performs vehicle-stopping control of the own car when an abnormality is detected by the abnormality detection section and the inter-vehicle distance from the leading car satisfies a predetermined condition, wherein ACC processing by the ACC section is removed and the vehicle-stopping control by the vehicle-stopping control section is not performed when an abnormality is detected by the abnormality detection section and the inter-vehicle distance is greater than a predetermined threshold value or the inter-vehicle distance is not on a decreasing trend.

2. The driving assistance apparatus according to claim 1, wherein the vehicle-stopping control section performs the vehicle-stopping control of the own car when an abnormality is detected by the abnormality detection section and the inter-vehicle distance is on a decreasing trend.

3. The driving assistance apparatus according to claim 1, wherein the vehicle-stopping control section performs the vehicle-stopping control of the own car when an abnormality is detected by the abnormality detection section, the inter-vehicle distance is equal to or less than a predetermined threshold value, and the inter-vehicle distance is on a decreasing trend.

4. The driving assistance apparatus according to claim 1, wherein ACC processing by the ACC section is removed when the vehicle-stopping control by the vehicle-stopping control section is executed.

5. The driving assistance apparatus according to claim 1, wherein the vehicle-stopping control section outputs a target deceleration speed at a fixed value independent of the detector in which an abnormality is detected.

6. The driving assistance apparatus according to claim 1, further comprising a state determination section that determines that the own car is about to be stopped, wherein the vehicle-stopping control by the vehicle-stopping control section is executed when the state determination section determines that the own car is about to be stopped.

7. The driving assistance method according to claim 6, wherein the state determination section determines whether the own car is about to be stopped, on basis of the inter-vehicle distance from the leading car and an own car speed.

8. The driving assistance apparatus according to claim 7, wherein the inter-vehicle distance from the leading car used in the determination of whether the vehicle stopping is about to be performed is a distance shorter than an inter-vehicle distance set for the ACC.

9. The driving assistance apparatus according to claim 1, wherein the vehicle-stopping control by the vehicle-stopping control section is continued until there is an operation relating to traveling by a driver.

10. A driving assistance method of assisting driving of a vehicle, the driving assistance method comprising:
    an ACC step of executing adaptive cruise control (ACC) on the basis of at least an inter-vehicle distance from own car to a leading car and a relative speed between the own car and the leading car;
    an abnormality detection step of detecting an abnormality of a detector used to execute the ACC; and
    a vehicle-stopping control step of performing vehicle-stopping control of the own car when an abnormality is detected in the abnormality detection step and the inter-vehicle distance from the leading car satisfies a predetermined condition, wherein
    ACC processing by the ACC step is removed and the vehicle-stopping control by the vehicle-stopping control step is not performed when an abnormality is detected in the abnormality detection step and the inter-vehicle distance is greater than a predetermined threshold value or the inter-vehicle distance is not on a decreasing trend.

* * * * *